Figure 1:
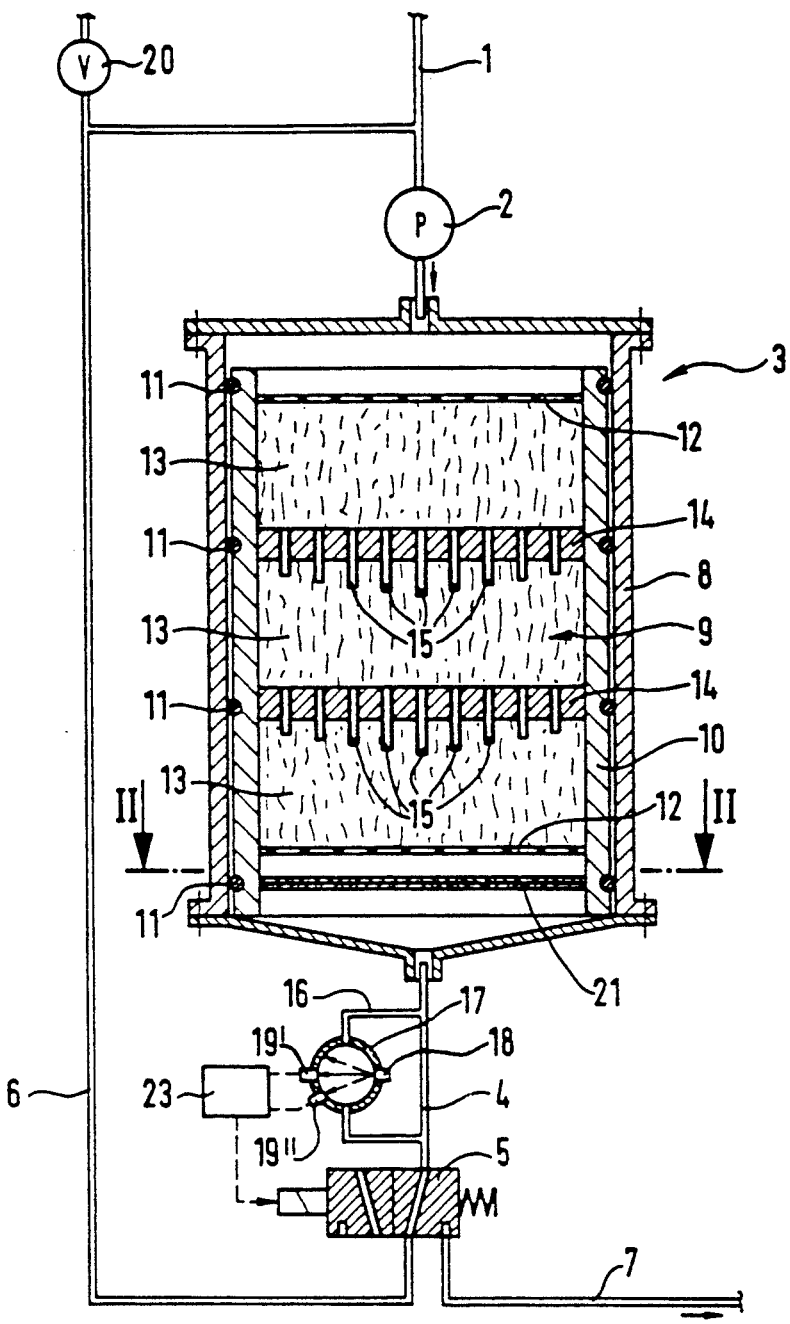

United States Patent [19]
Löhrl et al.

[11] Patent Number: 5,328,598
[45] Date of Patent: Jul. 12, 1994

[54] DEVICE FOR FILTERING CONTAMINATED WATER WITH MEANS TO MONITOR RESIDUAL CONTAMINATION

[75] Inventors: Volkhard Löhrl, Bottighofen, Switzerland; Andreas Gehringer, Constance, Fed. Rep. of Germany

[73] Assignee: Firma Fluid Team Automationstechnik GmbH, Fed. Rep. of Germany

[21] Appl. No.: 859,317

[22] PCT Filed: Nov. 16, 1990

[86] PCT No.: PCT/EP90/01957
§ 371 Date: May 28, 1992
§ 102(e) Date: May 28, 1992

[87] PCT Pub. No.: WO91/08036
PCT Pub. Date: Jun. 13, 1991

[30] Foreign Application Priority Data
Nov. 30, 1989 [DE] Fed. Rep. of Germany ....... 3939502

[51] Int. Cl.$^5$ .............................................. B01D 21/32
[52] U.S. Cl. ......................................... 210/93; 210/94; 210/96.1; 210/194; 210/424; 210/745
[58] Field of Search ............. 210/93, 94, 96.1, 96.2, 210/138, 141, 143, 194, 195.1, 195.2, 196, 424, 745, 416.1, 799; 73/61.48

[56] References Cited

U.S. PATENT DOCUMENTS

| | | | |
|---|---|---|---|
| 4,235,718 | 11/1980 | Lopez | 210/424 |
| 4,563,272 | 1/1986 | Yoshida et al. | 210/96.1 |
| 4,622,133 | 11/1986 | Furono | 210/195.2 |
| 4,698,151 | 10/1987 | Ozawa et al. | 210/96.1 |
| 4,840,730 | 6/1989 | Saxena | 210/96.1 |

FOREIGN PATENT DOCUMENTS

309380 3/1989 European Pat. Off. ............ 210/194

*Primary Examiner*—Joseph W. Drodge
*Attorney, Agent, or Firm*—Evenson, McKeown, Edwards & Lenahan

[57] ABSTRACT

A monitoring device (18, 19 or 21) for optically monitoring residual contamination of oil particles is arranged downstream of filter zone for filtering water (9) in order to block off, if necessary, a discharge line (7). Circulatory operation in which the liquid is recycled through the filter zone (9) is preferably first switched in on exceeding a threshold value for the residual contamination, in order to overcome any eventually occurring "apparent contamination", for example small air bubbles, there is also provided mechanisms for distinguishing between residual and apparent contamination.

3 Claims, 2 Drawing Sheets

DEVICE FOR FILTERING CONTAMINATED WATER WITH MEANS TO MONITOR RESIDUAL CONTAMINATION

The invention relates to a device for the filtration of contaminated liquids, in particular water which is contaminated by oil or oil containing substances, comprising a filter zone through which the liquid passes and in which contaminants are to be held back, for example by adsorption, and also a monitoring device arranged at the outlet side of the filter zone which on inadequate action of the filter zone switches off a pump conveying the contaminated liquid to the inlet side of the filter zone and/or blocks off a discharge line adjoining the outlet of the filter zone.

A corresponding device is described in GB-A-16 01 671. In this known apparatus the pump is arranged at the outlet side of the filter zone and the monitoring device reacts to the suction side pressure of the pump, i.e. to the pressure of the liquid between the outlet of the filter zone and the pump inlet. As the throttling resistance of the filter zone increases with increasing contamination the suction side pressure of the pump reduces with increasing contamination. On falling below a corresponding threshold value the connection between the outlet of the filter zone and the pump inlet is then blocked by means of a shut-off valve.

It is known from GB-A-717 479 to supply a contamination binding agent to a contaminated liquid which can then be subsequently held back together with the contamination it has bound in a filter zone through which the liquid passes. A monitoring device for the residual contamination of the cleaned liquid is arranged at the outlet side of the filter zone. This monitoring device reacts to the scattering of a light beam passing through the liquid which varies depending on the degree of the residual contamination and controls the supply of the contamination binder, in such a way that an excessive residual contamination is avoided.

The object of the invention is now to enable a particularly economical operation of filtration devices and in particular an ideal exploitation of the capacity of the filter zone.

This object is satisfied in accordance with the invention in that a circulation valve controlled by the monitoring device is provided which can be switched over between a throughflow position in which the outlet of the filter zone is connected to the discharge line, and a circulation position in which the outlet of the filter zone is connected to the suction side of the pump, the pressure side of which is connected with the inlet of the filter zone and in that in operating states in which the monitoring device registers an exceeding of a threshold value for the residual contamination of the liquid emerging from the filter zone the circulation valve can be changed over by the monitoring device to circulatory operation and, when the circulatory operation leads a lowering of the measured value for the residual contamination beneath the threshold value, can be switched over again into the throughflow position.

Through the possibility of switching over to circulatory operation, if necessary, in which the liquid to be cleaned is fed back again from the outlet side of the filter zone to the inlet side of the latter, and thus must pass anew through the filter zone, account is taken of the fact that different operating conditions can arise depending on the nature of the monitoring device in which the monitoring device registers an excursion above the threshold value for the residual contamination although in actual fact no impermissible residual contamination is present. Here the invention makes use of the recognition that these "apparent residual contaminants" only respectively occur for limited time intervals in contrast to "true residual contaminants". Accordingly the true contaminants cannot be directly distinguished by the monitoring device The true contaminants are distinguished in that on exceeding the threshold value of the residual contamination a changeover is first made to circulatory operation and check is made whether the degree of the registered residual contamination sinks beneath the threshold value in a relative short time during circulatory operation.

For the monitoring of the residual contamination there can for example be provided, in accordance with an expedient embodiment of the invention, a light emitter, the light beam of which passes through a region of the liquid at the outlet side of the filter and also light sensors which cooperate therewith in the manner of light barriers, with the outlet signals of the light sensors being dependent on the light intensities falling on the sensors and thus on the light scattering which occurs in the liquid. In this arrangement the outlet signals, or the ratio of the outlet signal levels of the light sensors, thus change(s) in dependence on the number of light scattering particles in the liquid at the outlet side of the filter zone. When therefore particles of contamination suddenly occur at the outlet side of the filter zone, for example fine oil droplets, the light scattering in the liquid is increased with the consequence that the outlet signals of the light sensors correspondingly change. In this manner an indication can, if necessary, be provided which reproduces the ratio between the number of the light scattering particles present in the liquid and the quantity or mass of the liquid. A monitoring device of this kind which exploits the light scattering can however not reliably distinguish between the light scattering particles of contamination and small air bubbles which likewise scatter the light and which can from time to time occur, because as a rule the liquid to be cleaned cannot be supplied to the filter zone completely free of air bubbles.

If now the monitoring device first switches over to circulatory operation on exceeding a threshold value of the permissible number of particles, then air bubbles can be readily distinguished from oil droplets. The number of the air bubbles will namely be greatly reduced during circulatory operation in the shortest time so that the number of particles then measured reproduces the number of oil droplets or of the particles of contamination. When therefore after a brief recirculatory operation the registered number of particles sinks clearly below the threshold value it is certain that the retaining capacity of the filter zone has not yet been used up, i.e. a changeover can be straightforwardly be made to normal filter operation, until it is again registered that the number of particles has exceeded the threshold value etc.

In a further expedient monitoring device for the residual contamination the effect is exploited that the electrical resistance of current paths through which the liquid can pass at the outlet side of the filter zone can change in dependence on the contamination when the liquid passes through or over elements which are arranged within the liquid at the outlet side of the filter zone and which are wetted or penetrated by the liquid.

In a particularly advantageous embodiment of a monitoring device which operates in accordance with this principle two electrodes which are connectable to opposite poles of a voltage source are arranged on a foil web, fabric web or fleece web which is washed by the liquid or through which the liquid passes.

When clean water washes or passes through the foil web, fabric web or fleece web, for example, then the current path which leads from electrode to electrode has a comparatively low electrical resistance; in contrast the electrical resistance increases very rapidly on contamination of the electrodes or of the foil web, fabric web or fleece web by oily contaminants, so that a rise of the electrical resistance represents a very sensitive signal for an undesired residual contamination. In this case, "apparent contaminants" in the form of gas or air bubbles can however also appear which can settle out at the foil web, fabric web or fleece web, or also at the electrodes, in particular if the filter system is temporarily stopped because no liquid to be cleaned has arisen. Through temporary circulatory operation the air or gas bubbles can be removed in the shortest time so that the electrical resistance of the current path after circulatory operation forms a measure for the actual contamination in the region of the current path.

Figure 2:
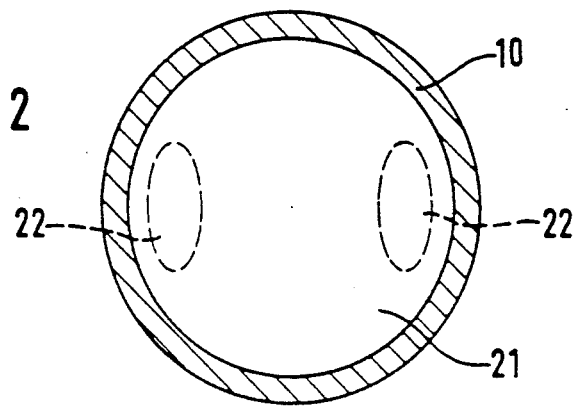
Figure 3:
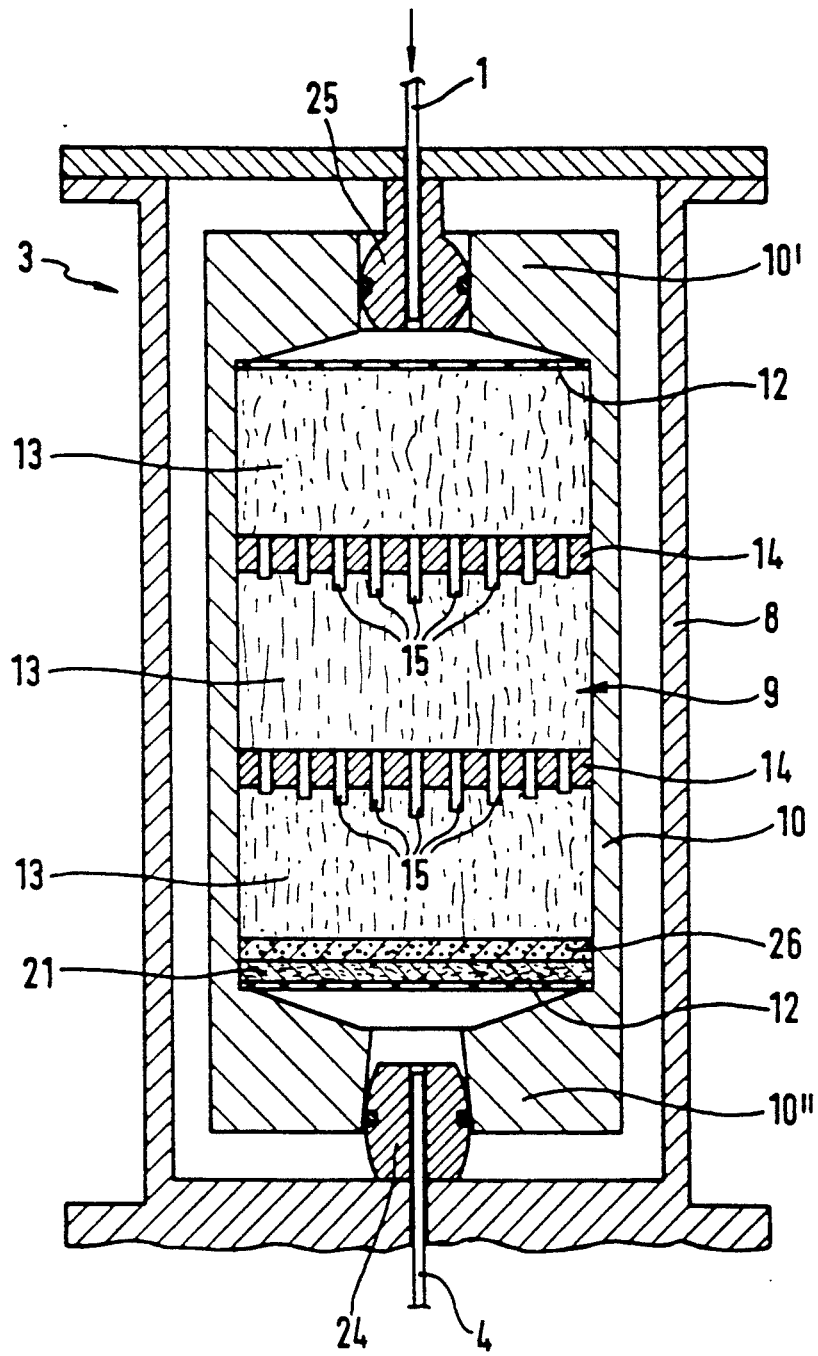

In other respects reference should be made, with respect to preferred features of the invention, to the claims and also to the subsequent description of advantageous embodiments of the invention with respect to the drawing. There are shown:

FIG. 1 a schematic overall illustration of an apparatus in accordance with the invention with the filter zone being shown in the form of a longitudinal section, FIG. 2 a plan view of a detail of the filter zone in accordance with the section line II—II in FIG. 1, and FIG. 3 an illustration corresponding to FIG. 1 of a modified embodiment.

In the plant illustrated in FIG. 1 water contaminated with oil is supplied via a line 1 to the suction side of a membrane pump 2 which is connected at the pressure side to the inlet of a filter device 3. A line 4 is connected to the outlet of the filter device 3 and can be connected via a circulation valve 5 either—as shown in FIG. 1—with a circulation line 6 or with a discharge line 7. The circulation line 6 is connected at the suction side of the membrane pump 2 to the inlet line 1 so that the water which emerges at the outlet of the filter device 3 is directed again through the filter device 3 in the circulation position of the circulation valve 5 when the membrane pump 2 is running.

The circulation valve 5 can be electrically actuated by a positioning magnet which on excitation changes the circulation valve 5 over from the illustrated circulation position into its throughflow position in which the line 4 is connected with the discharge line 7 by which the water coming out of the filter device 3 can be fed to the drains or can be reused. As soon as the electromagnet of the circulation valve 5 is deenergised, the circulation valve 5 is moved back into the illustrated circulation position by a resetting spring.

The control of the circulation valve 5 takes place in dependence on the residual contamination of the water which flows out of the filter device 3 into the line 4 in the manner which will be illustrated further below.

The filter device 3 has an upright cylindrical housing 8 with an upwardly disposed inlet and a downwardly disposed outlet. A filter set 9 of cartridge-like form can be inserted from above into this housing 8 after removing the upper end cover. This filter set 9 has a tubular jacket 10, the outer diameter of which is matched to the inner diameter of the housing 8. Through sealing rings 11 arranged at the external periphery of the jacket 10 in grooves or the like it is ensured that no water can pass from the inlet to the outlet of the filter apparatus through the ring gap between the outer side of the jacket 10 and the inner side of the housing 3.

The filter set 9 is retained in the jacket 10 by net-like grids 12 arranged at its end faces which are fixedly connected with the tubular jacket 10.

In the illustrated embodiment the set of filters consists of three filter layers 13 which consist of oil absorbing filter material. In this arrangement the filter material preferably consists of bands, cords, snippets or the like of polypropylene of greater or lesser length which are closely packed together in the manner of a cushion. Through this band or cord-like structure of the oil absorbing material of the filter layers 13 one can, on the one hand, provide a desirable permeability for the water passing through the filter device 3 and, on the other hand, labyrinth-like flow paths are provided so that oil particles carried along in the water can be absorbed over long paths in the filter layers 13. In this way a high degree of cleaning of the water leaving the filter device 3 can be achieved.

Plates 14 are arranged between the filter layers radial to the axis of the jacket 10 and a plurality of narrow bores or tubules 5 for the passage of the water from one filter layer 13 to the next pass through the plates in the axial direction. The cross-section of the bores of the tubules 15 is so narrowly dimensioned that the latter act as restrictors.

In this way, during operation of the pump 2, a certain back pressure arises above the plates 15 in the water passing through the filter device 3. This has the consequence that the water passing through the filter device 3 is in each case distributed above the plates 14 over the whole cross-section of the adjoining filter layers 13 and the adsorbent action of the filter layers 13 can also be exploited effectively and fully close to the jacket 10.

Furthermore, the bores or tubules cause the water which passes through to be distributed in the desired manner over the entire cross-section of the filter layers 13 respectively arranged beneath the plates 14. If necessary the restrictor resistance relative to the vertical axis of the jacket 10 can be made smaller for the radially further outwardly disposed bores or tubules 15 than the restrictor resistance of the further inwardly disposed bores or tubules 15. This can be achieved, if necessary, even with identical cross-section of all bores or tubules 15, for example in that the bores or tubules 15 with the lower restrictor resistance have a correspondingly shorter length. In other respects the tubules can project into the respective lower filter layer 13.

All these measures contribute to ensuring that the filter layers 13 can be uniformly exploited, i.e. that at the end of the service life of the filter set 9 the radially outwardly disposed regions of the filter layers 13 have also adsorbed approximately the same quantity of oil as the further inwardly disposed regions.

The plates 14 can thus consist in the same way as the jacket 10 of a plastic material, with a dismantlable connection between the jacket 10 and the plates 14 being preferred in order to permit a regeneration or exchange of the filter layers 13 at the end of the operating period of the filter set 9.

In accordance with a preferred embodiment of the invention provision is made for continuously monitoring the degree of residual contamination of the water at the outlet side of the filter set 9. For this purpose a by-pass line 16 which leads through a chamber 17 with a light emitter 18 and also a first light sensor 19' which cooperates therewith in the manner of a light barrier can be provided at the outlet line 4. The light emitter 18 generates a bundled infrared light beam which passes through the water in the chamber 17 and is directed onto the light sensor 19'. The light beam is differentially strongly scattered in the water within the chamber 17 when light scattering particles, for example fine oil droplets, are present in the water. Depending on the degree of the light scattering particles present in the water a differential light intensity then falls on the light sensor 19' and at the same time a further light sensor 19" which is disposed to the side of the axis of the light beam is differentially strongly illuminated. Accordingly, a varying ratio arises between the levels of the output signals of the light sensors 19' and 19" which are dependent on the received light intensity, depending on the number of the light scattering particles in the water. This ratio is evaluated by a monitoring unit 23 which on exceeding a threshold value of the said level ratio, or a predetermined number of particles, switches over the circulation valve 5 into the circulation position illustrated in FIG. 1. For this purpose the electromagnet of the circulation valve 5 merely needs to be switched so that it is deenergised.

The pump 2 initially continues in operation after switching over of the switch-over valve 5 into the circulation position, i.e. the filter device 3 is operated in circulation, with the water being led anew from the outlet of the filter device 3 to the inlet of the same and accordingly passing again through the filter set 9.

Through the circulation operation account can be taken of the fact that a relatively large number of light scattering particles can occur in the water, at the outlet side of the filter set 9, without true contamination being present. By way of example small air bubbles can occur in great numbers since it is practically unavoidable that larger quantities of air will be carried along in the contaminated water supplied via the line 1. Through the circulatory operation the number of the small air bubbles which scatter the light can be rapidly reduced so that the "apparent contamination" of the water caused by the air bubbles is overcome at the outlet side of the filter set 9. (A venting valve 20 can be arranged at the circulation line 6 for leading away larger quantities of air).

When, therefore, rapid lowering of the number of light scattering particles below a threshold value can be achieved through the circulatory operation, then this means that no true contaminants are present and the filter set 9 is still operating adequately.

Accordingly the circulation valve 5 can again be changed over into its throughflow position, for example by energising the electromagnet of this valve.

If the threshold value of the number of light scattering particles is exceeded anew then a change-over is again first made to circulatory operation. Should the number of particles then not sink adequately, then the pump 2 is also switched off. This can, if necessary, be indicated by a special signal.

The plant must now be checked; as a rule, it will only be necessary to exchange the filter set 9.

The residual contamination of the water at the outlet side of the filter set 9 can also be monitored in other manners.

Particularly advantageous in this respect is the possibility of determining the electrical resistance of a current path through which the water passes or which leads via elements or surfaces contacted by the water.

In a constructionally particularly advantageous embodiment a double-fleece layer 21 can be arranged at the lower end of the jacket 10 of the filter set 9 through which the water passes and consists in principle of the same fiber material as the filter layers 13. Spaced apart electrodes 22 are arranged between the fleece layers—see also FIG. 2—and are intimately connected with the fleece layers 21 or are embedded in the latter. The fleece layers 21 thus form a carrier for the electrodes 22.

If the electrodes 22 are connected to opposite poles of a voltage source then a current path forms between the electrodes 22 and leads through the water or through the fleece layers, with the electrical resistance of the current path depending very sensitively on whether or not oil has been absorbed by the fleece layers 21. In this arrangement the electrical resistance of the current path increases with increasing quantity of the adsorbed oil. As soon as a threshold value of the electrical resistance is exceeded the discharge line 7 can be automatically separated from the outlet line 4 in order to reliably avoid a discharge of excessively contaminated water.

The resistance of the current path can also basically be greatly increased by the temporary appearance of air or gas bubbles, in particular at the electrodes 22. For this reason provision can be made on exceeding the threshold value of the electrical resistance to first switch over to circulatory operation. In this way one can first await, without the danger of introducing excessively contaminated water into the discharge line 7, until the air or gas bubbles have been reduced by the continued flow of the water.

Should however the electrical resistance of the current path remain above the threshold value then the system must be checked and as a rule it will only be necessary to exchange the filter set 9.

The fleece layers 21 with the electrodes 22 can be formed as part of the filter set 9 at the jacket 10 so that this monitoring element is always necessarily exchanged together with the filter set 9. The electrical lines for the electrodes 22 can be embedded in the material of the jacket 10 and can be connected to a cable which is led outwardly through a corresponding opening in the upper cover of the housing 8. Thus the electrodes 22 can be connected in a particularly simple manner to an external monitoring unit which also supplies the electrodes 22 with current.

Other methods for monitoring the residual contamination can also basically be used.

For example it is possible to arrange pressure sensors above and below the fleece layers 21 in order to determine the difference of the pressures above and below the fleece layers 21. As the restrictor action of the fleece layers 21 increases significantly with the quantity of the oil adsorbed by these layers 21 the pressure difference is also a sensitive measure for the residual contamination.

With contaminants which like oil have a lower density than water and which are thus urged upwardly, it is advantageous when the contaminated water is supplied to the filter set 9 from above or flow takes place downwardly through the filter set 9. In this way the oil contamination can be kept back both by the filter material and also by the buoyancy forces.

The use of membrane pumps 2 is advantageous because in such pumps the oil contaminants—other than is the case with the customary centrifugal piston pumps—do not form emulsions with the water from which the oil is substantially more difficult to remove them from oil water mixtures.

FIG. 3 shows a modified layout of the filter set 9 in comparison to FIG. 1.

Here the jacket 10 is formed in the manner of a cartridge with upper and lower bases 10' and 10" in which respective central openings are arranged. These central openings have, as a result of the relatively large thickness of the bases 10' and 10" a certain axial length which can optionally also be achieved by the provision of tubular stubs. The lower central opening can also broaden somewhat conically downwardly. In corresponding manner the upper central opening can enlarge somewhat conically upwardly. However it is basically also possible to make the said openings cylindrical. After removing the upper cover of the housing 8 the cartridge formed by the jacket 10 can be set onto a lower stub 24 which is arranged at the base of the housing 8 and which has a central opening connected to the line 4. At the upper cover of the housing 8 there is provided a further stub 25 which can be pushed into the central opening of the upper base 10'. Seals are arranged at both stubs 24 and 25 which close off the ring gap between the inner walls of openings in the basis 10' and 10' and the outer periphery of the stubs 24 and 25. In this way the filter set 9 can be held unsupported within the housing 8, as illustrated in FIG. 3.

Thus, on the one hand, the seals 11 shown in FIG. 1 between the jacket 10 of the filter set 9 and the housing 8 are unnecessary. Moreover, the exchange of the filter set 9 is facilitated because a spacing remains between the jacket 10 and the housing 8 so that the filter set 9 is easier to grasp.

In other respects the filter set 9 in FIG. 3 has a slightly modified internal layout. Here an active carbon mat 26 is arranged beneath the lowermost adsorbing filter layer 13. Beneath this there is located a single or double fleece layer 21 in which electrodes 22 (see FIG. 2) can optionally be embedded in order to obtain a signal concerning the residual contamination by measurement of the conductivity of the current path between the electrodes. As a rule this fleece layer 21 again consists of the same material as the filter layers 13, i.e. for example of polypropylene. Beneath the fleece layer 21 there is then arranged the lower grid 12 so that all the layers of the filter set 9 through which the liquid to be cleaned flows are held between an upper and a lower grid 12.

Above or beneath the grid 12 there remains within the jacket 10 a certain funnel-like free space in order to distribute the liquid running into the filter set or to collect the liquid running out of the filter set respectively.

The plates 14 between the filter layers can be formed in the same manner as was explained with reference to FIG. 1, i.e. bores or tubules 15 with differential cross-sections and/or lengths can pass through these plates 14.

The jacket 10 of the filter set can consist both in the embodiment of FIG. 1 and in the embodiment of FIG. 3 of polypropylene (in solid homogenous form). This material is also suitable for the plates 14.

We claim:
1. Apparatus for filtration of water which is contaminated by oil or oil containing substances and may contain air bubbles, comprising:
  a filter zone with an inlet and an outlet enabling contaminated water to flow though the filter zone, the filter zone having an absorption capacity for retaining oil contaminants by adsorption , the filter zone thereby preventing a substantial passage of the oil contaminants from the inlet to the outlet until the adsorption capacity has been reached;
  an inlet line through which the contaminated water is provided to the inlet of the filter zone;
  a circulation line connected between the outlet and the inlet of the filter zone;
  a discharge line connectable to the outlet of the filter zone;
  a circulation valve between the outlet of the filter zone and the discharge line and the circulation line, said circulation valve being switchable between a throughflow position in which the outlet of the filter zone is connected to the discharge line, and a circulating position in which the outlet of the filter zone is connected to the circulation line;
  a pump having a suction side and a pressure side, the suction side being connected to the inlet line and the circulation line, the pressure side being connected to the inlet of the filter zone, said pump feeding water from the inlet line to the inlet of the filter zone in a throughflow operation or from the outlet of the filter zone to the inlet thereof in a circulatory operation in dependence on the position of the circulation valve; and
  means for monitoring the contamination of the water, the means for monitoring including a light emitter arranged to pass a light beam through the water at the outlet of the filter zone, and a light sensor adapted for activation by the light beam and generating an output signal having a signal level dependent on light intensities incident on the light sensor, said light intensities being a measure of light scattering caused by light scattering particles including oil particles and air bubbles in the water, the signal level changing as a function of both the quantity of oil particles and the quantity of air bubbles;
  means for determining an exceeding of a threshold value of the light scattering and a lowering of the light scattering below the threshold value based on the output signal;
  means, responsive to the determining means, for changing the circulation valve from the throughflow position to the circulation position upon the exceeding of the threshold value of the light scattering, and for changing the circulation valve back to the throughflow position upon the lowering of the light scattering beneath the threshold value;
  means for monitoring a reduction in the light scattering occurring when the valve is in the circulation position to a substantial reduction of the light scattering indicative of air bubbles, and a negligible reduction of the light scattering indicating that the adsorption capacity of the filter zone has been reached and substantial quantities of the oil particles are passing the filter zone and that a renewal or regeneration of the filter zone is necessary.

2. Apparatus in accordance with claim 1, wherein the means for monitoring includes means for switching off the pump when the measured value of residual contamination is not lowered beneath the threshold value within a predetermined time as a result of the circulation valve being switched to the circulation position.

3. Apparatus in accordance with claim 2, further comprising a display coupled to the means for monitoring, the display providing an indication of the number of light scattering particles.

* * * * *